Sept. 6, 1966  W. STEDTNITZ  3,271,730
ELECTRICAL COUNTING MECHANISM
Original Filed Aug. 24, 1962

INVENTOR.
WOLFGANG STEDTNITZ

BY

McGlew & Toren
ATTORNEYS

United States Patent Office 3,271,730
Patented Sept. 6, 1966

3,271,730
ELECTRICAL COUNTING MECHANISM
Wolfgang Stedtnitz, Bad Ragat, Switzerland, assignor to Aktiebolaget Bofors, Bofors, Sweden
Original application Aug. 24, 1962, Ser. No. 219,345. Divided and this application Oct. 22, 1964, Ser. No. 411,665
Claims priority, application Germany, Aug. 24, 1961, A 38,178
1 Claim. (Cl. 340—3)

This application is a division of my copending application Serial No. 219,345, filed August 24, 1962.

This invention relates to electrical counting mechanism and, more particularly, to a novel and simplified combination of interrelated electrical counters including at least one measurement impulse counter and whereby an exit impulse is delivered from such measurement impulse counter only in the event that a preselected number or preselected combination of entering measuring impulses is present in the measurement counter within a predetermined time period.

When signal impulses entering an electrical counting mechanism are to be processed further in digital counting circuits, storage means operating on the analog principle, and thus integrating the incoming charges, are not suitable. This is particularly true wherein, during a particular time interval of the impulsing period. a signal impulse is expected and has to be distinguished from fortuitous irregular disturbance impulses. In such case, known storage methods and apparatus are extremely complicated and very delicate in operation.

In the tele-communications art, and especially in the radar art, it is frequently necessary to recognize entering signal impulses which differ from disturbance impulses of essentially the same amplitude only in that the signal impulses are characterized by exact periodicity.

With optimum dimensioning of the tele-communication system, improved discrimination between the signal impulses and the disturbance impulses is possible only by lengthening the observation time to cover several impulse periods or, stated another way, by fully utilizing the periodicity of an echo impulse, for example, as in an echo sounding system. By this expedient, the desired signal impulses can be effectively discriminated from the fortuitously occurring disturbance impulses. A practical application of this known expedient occurs, for example, with known line storage devices, such as tubes, in which the line storage is scanned once per each impulse period. Excitation of the storage means is effected by the scanning means, with clearing being effected generally by slow decay of the stored charges. With Braun tubes, or cathode ray tubes, the same effect is utilized for the production of radar pictures. The impulse lines are written so close together that genuine echo impulses or desired impulses brighten the picture screen to a much more intense amount than do fortuitous disturbance impulses.

In accordance with the present invention, it has been found that a simple electrical counting mechanism which is usable for the most diverse counting programs can be provided by utilizing two electrical impulse storing counters and so interconnecting these counters that, responsive to the presence of a first predetermined combination of stored impulses, one of the counters will clear the other before delivery of an exit impulse and, responsive to the presence of a second predetermined combination of stored impulses, the other counter will clear such first counter before delivery of an exit impulse.

With the counting mechanism of the present invention, the aforementioned problem of discriminating between desired pulses, such as echo pulses, and disturbance pulses can be solved in a simple manner and without resorting to observation by the human eye. More particularly, there are, in such an instance, two electrical impulse storage counters, one of which may be termed a measurement counter and the other a time counter. The measurement counter counts or stores measurement impulses, while the time counter is controlled by regularly spaced time impulses having a predetermined time sequence. If a predetermined number of entering time impulses are counted or stored by the time counter before a measurement impulse is received and stored by the measurement counter, the time counter clears the measurement counter. On the other hand, if the measurement counter, since its last clearance, has counted a particular number of measurement impulses or stored a particular impulse sequence before the time counter has counted and stored such predetermined number of time impulses the measurement counter will deliver an exit impulse.

With time intervals which are indeterminate with respect to their beginning and ending, the counting mechanism of the present invention can be designed to have two electrical impulse and storing counters, one of which is a measurement counter and the other a time counter. The measurement counter stores incoming measurement impulses while the time counter, at the end of a predetermined time interval after the last arriving measurement impulse, clears the measurement counter. On the other hand, the measurement counter is effective to deliver an exit impulse if such predetermined time interval has not elapsed since the last clearing of the measurement counter, or if a particular entering impulse sequence has been stored in the measurement counter since its last clearance and before the expiration or elapse of the predetermined time interval.

If the problem to be solved does not involve a particular time interval but, for example, the comparison of two entering impulse sequences, then the counting mechanism can be designed in such a way as to include two electrical impulse and storing counters with an entering impulse of one counter clearing the other counter and with each of the two counters delivering an exit impulse only if a preselected impulse sequence, or a preselected number of impulses, enters either counter before the latter is cleared by an entrance impulse of the other counter.

Advantageously, the electrical impulse storing counters can utilize magnetic storage units such as ferrite cores having a substantially rectangular hysteresis loop, with these cores being provided with supplementary clearing windings. Thus, the cores in the measurement counters may be provided with a clearance winding which is excited by an exit impulse of the time counter, and the cores in the time counter may be provided with a clearance winding which is excited by an entrance impulse of the measurement counter. The measuring counter and the time counter also may be designed as shift registers consisting of such magnetic cores or of transfluxors.

For further increasing the discrimination with respect to disturbance pulses, the exit impulse of the time counter, before amplification, may be passed through an L–R low pass filter which will filter out relatively short disturbance impulses but which will pass the longer useful impulses. Such filters may be designed with respect to the desired program, in a known manner.

While the electrical counting mechanism of the invention may be employed for a great diversity of purposes, it may be especially mentioned that it is useful for discriminating between disturbance impulses and periodically repeating echo impulses, such as used in a reflection sounding method, as well as for ascertaining radiation levels and for distinguishing between various preselected impulse groups.

For an understanding of the present invention, reference is made to the following description of typical embodiments thereof as illustrated in the accompanying drawings.

Figure 1:
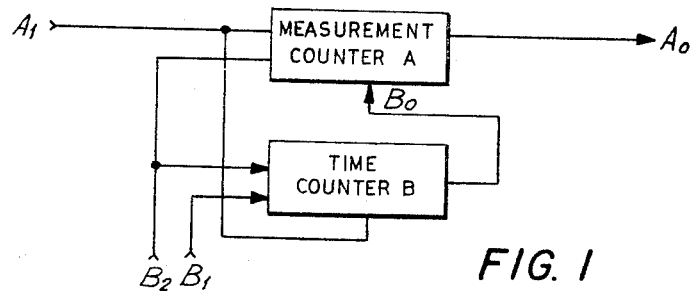
FIG. 1 is a block diagram of electrical counting mechanism embodying the invention and comprising a measuring counter and a time counter.

Referring to the drawings, the main components of the counting mechanism embodying the invention are two electrical impulse storing counters A and B which are connected in opposition relative to their respective functions. Counter A, which may be called a measurement counter, counts the impulse periods during which entrance impulses $A_1$ occur. However, the stored contents of counter A may be cleared by an exit impulse $B_0$ of counter B which may be termed a time counter. Time counter B counts the successive periods of impulse sequences such as, for example, the period during which transmitted impulses $B_1$ are counted. Conversely, the counter B is cleared by every entering impulse $A_1$. As a result, counter B counts only those impulse periods in which there is no occurrence of an entrance impulse $A_1$.

If, during a time interval involving $n$ periods of impulse sequences, the counter A counts $m$ or more impulse periods in which there occur entrance impulses $A_1$, then the counter A delivers one or more exit impulses $A_0$. If, during this same time period, there are counted fewer than $m$ impulse periods during which there occur entrance impulses $A_1$, then counter B delivers an exit impulse $B_0$ which clears the contents of counter A. Accordingly, the entrance impulses which have occurred up to the time of such clearing, are evaluated as disturbance impulses and are cleared by the clearing of counter A so that there will be no occurrence of an exit impulse $A_0$.

While counters A and B may comprise any known type of counter circuitry, a particular simple counter, operable efficiently with the counting mechanism of the present invention, is provided by utilizing magnetic storage units, such as ferrite cores having rectangular hysterisis loops. Accordingly, the following detailed description will relate to counters employing such rectangular hysterisis loop magnetic cores and operating as shift registers with two storage cores per bit. It will be understood that other forms of counters utilizing such storage cores may be used, such as flip-flops, shift registers with one storage core per bit, or shift registers comprising transfluxors.

Figure 2:
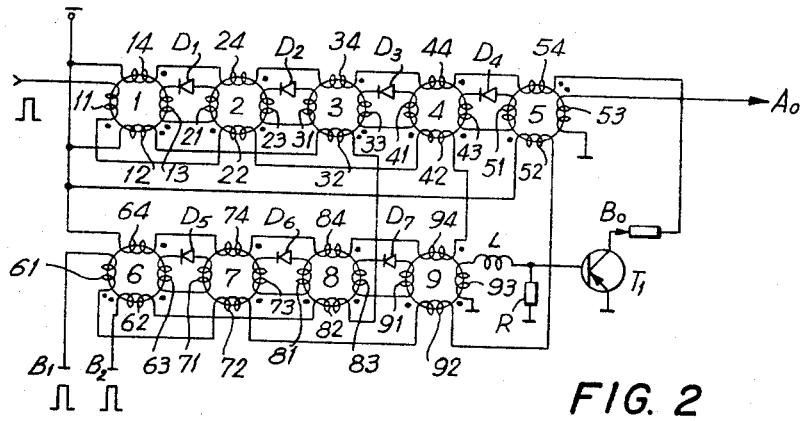
FIG. 2 is a schematic wiring diagram of the counting mechanism illustrated in block form in FIG. 1.

FIG. 2 illustrates a schematic wiring diagram of counting mechanism embodying the invention, and utilizing such magnetic storage cores. Counter A comprises cores 1 through 5, while counter B comprises cores 6 through 9. Each counter is, in effect, a shift register which is controlled by different current impulses. Reference characters $B_1$ and $B_2$ indicate entering impulses which act in counter B, in a known manner, as shifting impulses in the windings 62, 72, 82 and 92 and which follow each other periodically at the frequency of the impulse sequences. The impulse $B_2$ may, for example, coincide in time with the transmitted impulse of a locating device. The impulse $B_1$ cannot coincide in time with the impulse $B_2$, nor may it occur at a time during which an entrance impulse $A_1$ may be expected.

In counter A, current impulse $B_2$ is operative as a shifting impulse in the windings 12 and 32. The current impulse $A_1$ entering the counter A may have three different functions. In the first place, it is stored in magnetic core 1 by means of a winding 11. The shifting impulse $B_2$ following the impulse $A_1$ shifts the stored entrance impulse $A_1$ into the core 2, by means of a "primary winding" 12 and a "secondary winding" 13, and through the medium of a winding 21 and a then conductive diode $D_1$.

As a second function, the entering impulse $A_1$ can operate as a shift impulse with respect to core 2 by means of the windings 22, 23 and 31 and a diode $D_2$, in the event that core 2 has already been remagnetized by an earlier entering impulse $A_1$ shifted from core 1 into core 2. The same function takes place with respect to core 4 through the medium of the corresponding windings 42, 43 and 51.

As a third function, the entering impulse $A_1$ can serve as a clearing pulse in the windings 64, 74, 84 and 94. Since the cores 6, 7, 8 and 9 are all magnetized by the clearance windings in the same direction and at the same time, there can be no transmission of an impulse from one core to another, such as a shifting of an impulse.

The manner of operation of the counting mechanism in a time sequence is as follows:

(1) Impulse $B_1$ is stored in core 6 by means of winding 61.

(2) Impulse $B_2$ shifts the stored impulse $B_1$ from core 6 into core 7.

(3) Another impulse $B_1$ is stored in core 6, with the previous impulse $B_1$ being shifted from core 7 into core 8.

(4) An impulse $B_2$ shifts a stored impulse $B_1$ into core 9 or 7.

(5) An impulse $B_1$ is again stored in the core 6, with a further shifting from core 7 to core 8 resulting in an exit impulse appearing, through an L–R filter, as a forward biasing signal on a transistor $T_1$. The collector current of the transistor $T_1$ provides a current impulse $B_0$ which acts as a clearing impulse in all of the cores of counter A, by virtue of flowing through the windings 14, 24, 34, 44 and 54.

As a result, all of the impulses $A_1$ stored in the cores 1 through 4 up to that time are cleared, and all of the cores are magnetized back to the starting position zero. Thus, a shifting impulse now occurring will no longer result in there being an exit impulse because it traverses the core windings in the same directions as does the clearing impulse so that none of the cores can be remagnetized. If core 5 receives an impulse it will, even during remagnetization by means of the clearing winding 54, deliver an exit impulse to the winding 53. Thus, this particular impulse has traversed the counting system. In other words, the counting system has established that the first impulse is a sequence of at least $m=3$ entrance impulses $A_1$ and that, between two impulse periods in which entrance impulses $A_1$ occur, there is at least one impulse period during which no entrance impulse $A_1$ occurs.

Thus, the counting process proceeds, with each impulse $B_1$ producing, through the transistor $T_1$, a clearance impulse $B_0$ which clears the counter A. Usually, the counter A is already cleared, so that the clearance impulse no longer has any practical effect thereon.

When an impulse $A_1$ enters the counting mechanism, the latter functions as follows:

(6) Entering impulse $A_1$ arrives at counter A, resulting in complete clearing of counter B so that the counting process of the latter must be restarted as previously described. The entrance impulse $A_1$ is stored in the core 1.

(7) An entering impulse $B_1$ has, at first, no influence on the counter A. However, with respect to counter B, this entering impulse $B_1$ is stored in the core 6 by means of the winding 61.

(8) An entering impulse $B_2$ operates on counter A to shift the stored impulse $A_1$ from core 1 into core 2. At the same time, and with respect to counter B, it shifts the stored impulse $B_1$ from core 6 into core 7.

(9) An entering impulse $A_1$ is again stored in core 1, resulting in a transmission from core 2 to core 3. Also, counter B is again completely cleared.

(10) The next impulse $B_1$ has, at first, no influence on counter A. This next impulse $B_1$ is again stored in the core 6 by means of the winding 61.

(11) The next entering impulse $B_2$ shifts the core 1 and also effects transmission from core 3 to core 4. This impulse $B_2$ shifts the core 6.

(12) A further entering impulse $A_1$ effects a shift from core 4 to core 5 and from core 2 to core 3, and is stored in core 1. At the same time, the counter B is again completely cleared.

(13) A following impulse $B_1$ switches the core 5 back and provides, at winding 53 of core 5, an exit impulse $A_0$.

Each succeeding impulse $A_1$ brings about a further transmission from core 4 to core 5 so that, at the next current impulse $B_1$, there is again provided an exit impulse $A_0$.

If no impulse $A_1$ enters the counting mechanism during two impulse periods, winding 93 of counter B, through the medium of transistor $T_1$, provides a clearance impulse $B_0$ to clear the counter A so that the counting procedure must be restarted. This may be the case in the event that counter A has first any exit impulses $A_0$ at all.

Figure 3:
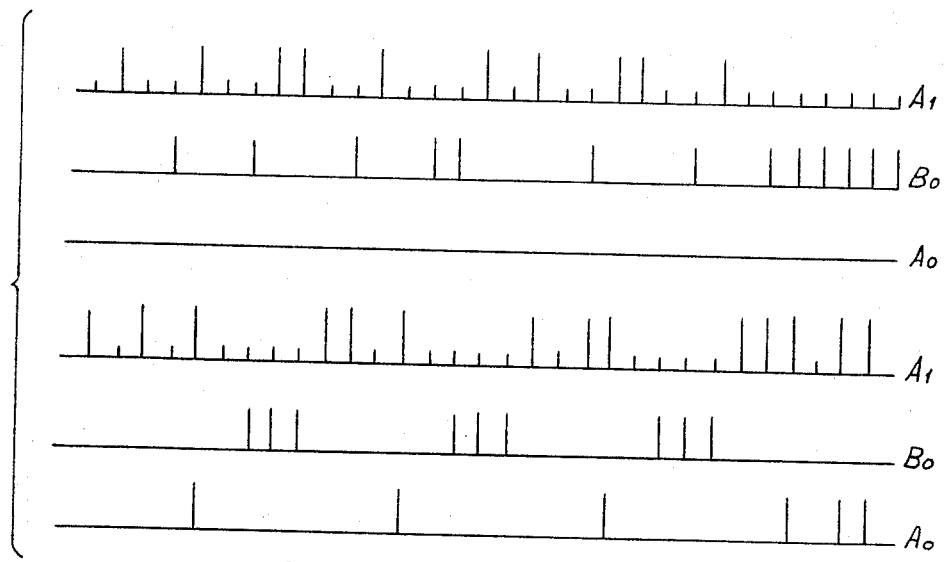
FIG. 3 is a graphical illustration of the manner of operation of the counting mechanism of FIGS. 1 and 2.

FIG. 3 illustrates the relation of the entering impulses $A_1$, the clearance impulses $B_0$, and the exit impulses $A_0$ for various time combinations of impulses $A_1$. It should be noted that the counters shown in FIG. 2 are only exemplary, and that counter A always has $2m-1$ cores and counter B always has $2n$ cores.

For either clearance or indication, when $m$ denotes the number of impulse periods during which there occur impulses $A_1$, $n$ denotes the impulse periods during which no entrance impulses occur, $k_B$ denotes the number of cores of counter B, and $k_A$ denotes the number of cores of counter A, the following conditions are valid:

The clearance condition for counter A is $$k_B \leq 2n$$

or (a)
$$n \geq \frac{k_B}{2}$$

The condition for an exit impulse $A_0$ is:

$$k_A \leq 2m-1$$

or (b)
$$m \geq \frac{k_A + 1}{2}$$

As will appear from the exemplary statements made hereinafter, it is advantageous to interpret the functioning of the counting mechanism from the standpoint of probability calculation.

(c)
$$w = \frac{m}{m+n}$$

is the relative probability. Also, $w$ may be interpreted as the "relative probability limit" of the counting mechanism. According to the clearance condition (a), the condiiton that $n=k_B/2$ is valid for the counting arrangement shown in FIG. 2. That is, in order for no clearance to be effected, $n$ must equal 1. This means that between every impulse period which contains an entrance impulse $A_1$ there must be, at the most, only one impulse period during which no entrance impulse occurs. In this special case, therefore, $w=1/(1+1)=0.5$. If the relative probability is such that $w=0.5$ and it is reached or exceeded, then the clearance condition is no longer fulfilled. However, if the relative probability limit is exceeded so far that at least, according to (b), $m=(k_A+1)/2$, and thus, in the illustrative example, $m=$three impulses, which can pass through the counter, then the counting mechanism delivers an exit impulse $A_0$.

The described arrangement can be used wherever it is necessary to ascertain when an average probability limit is consistently exceeded. Thus, it can be used with all problems based on statistical processes or for the regulation of error deviations which may occur, for example, such as length, thickness, speed, or angle errors.

In order for counter A to furnish an exit impulse $A_0$, the clearance of counter A cannot take place while the conditions for an exit impulse must be fulfilled. From the combination of these two conditions, it follows that a large number of different impulse combinations can still produce an exit impulse $A_0$ with a minimum number of entering impulses $A_1$. As can be seen from FIG. 3, with the arrangement of FIG. 2, only four entrance impulse combinations leading to an exit impulse from the counter A are possible. With the use of a larger number of cores than in the specific arrangement shown in FIG. 2, the number of possible combinations increases very rapidly. The proper number of cores depends solely upon the use to which the counting mechanism is to be put, and must be adapted to a particular counting system.

The possible uses of the counting mechanism thus far described are very diverse. Of a large number of possible uses, the following may be particularly mentioned. The counting mechanism may be advantageously used for digital evaluation of echo impulses in a proximity ignition system. Except for disturbance impulses which can be expected occasionally, no echo impulses are received until the target is so close that echo signals reflected from the target are received. Since a particular member of echo signals reflected from the target must first enter the counting mechanism before an exit impulse can be delivered thereby, it may be safely assumed that fortuitously occurring disturbance impulses, or echo impulses, from too small targets which are swept only briefly, cannot cause an unintended release of an exit impulse. A single shot blocking oscillator interposed between the output of the impulse receiver and the input of the counting mechanism assures that only entrance impulses equaling or exceeding a particular amplitude will be counted. Such an oscillator transforms the entering impulses into impulses of constant current value and duration, such as are advantageous for controlling the magnetic cores.

The described counting mechanism can also be used advantageously as an automatic warning means for too high a level of radioactive radiation. In such case, the entrance impulses $A_1$ are derived from a Geiger counting tube. An impulse oscillator, having a constant or regulatable impulse frequency, delivers the shifting impulses $B_1$ and $B_2$. The frequency of this oscillator is set at such a value that, below the particular density of radiation, the entrance impulses $A_1$ from Geiger tube cannot pass through the counter A because, due to there being too small a number of such entrance impulses during a given time period, the counter A is repeatedly cleared by exit impulses $B_0$ from the counter B. If the average statistical radiation density increases, then, and conversely, it is the counter B which is repeatedly cleared by the entrance impulses $A_1$, so that the counter B is no longer effective to produce a clearing impulse $B_0$ for clearing the counter A. Under these conditions the entrance impulses $A_1$ pass through the counter A and appear as exit impulses $A_0$ which may be used to trigger regulating arrangements or to activate other safety measures. It should be noted that statistical variations in the entering impulse density are the better compensated the larger the number of cores contained in the counters A and B.

In the two specific uses mentioned above, the simple construction, minimum current consumption, minimum detail requirements, and minimum space requirements, as well as the temperature sensitivity of the circuitry, are particularly advantageous. An equivalent transistor circuitry, not using the magnetic storage cores would, on the other hand, require several times the number of construction parts or components, particularly components susceptible to disturbance.

While a specific embodiment of the invention has been shown and described in detail to illustrate the application of the principles of the invention, it will be understood that the invention may be embodied otherwise without departing from such principles.

What is claimed is:

For use in echo sounding operations in which impulses are transmitted at the start of successive sounding periods having echo impulse receiving times corresponding to a selected sounding range, and the distance of an object within the selected sounding range is determined by measuring the elapsed time, during each sounding period, at which a transmitted impulse reflected by the object is received as an echo impulse; means for discriminating between disturbance impulses and periodically received echo impulses comprising, in combination, a measurement counter effective to count and store incoming echo impulses; a time counter operable responsive to receipt of successive control impulses of a preselected time sequence, and one of which coincides with a transmitted impulse; means interconnecting said counters; means operable by said time counter to clear said measurement counter when said time counter has counted a first particular number of control impulses during which said measurement counter has not received echo impulses; and means operable by said measurement counter, upon receipt of a second particular number of echo impulses since the last clearance of said measurement counter, or in response to receipt of a particular sequence of echo impulses since the last clearance of said measurement counter, and before said time counter has counted said first particular number of control impulses, to deliver an exit impulse.

No references cited.

CHESTER L. JUSTUS, *Primary Examiner.*

R. A. FARLEY, *Assistant Examiner.*